Oct. 18, 1955

D. MULLAN ET AL

2,720,690

APPARATUS FOR THREADING BASES ON
THE LEADS OF FLUORESCENT LAMPS

Filed April 6, 1951

INVENTORS
DANIEL MULLAN
THEODORE F. MAY
HUGO BAUER
BY
ATTORNEY

Oct. 18, 1955 D. MULLAN ET AL 2,720,690
APPARATUS FOR THREADING BASES ON
THE LEADS OF FLUORESCENT LAMPS
Filed April 6, 1951 5 Sheets-Sheet 3

INVENTORS
DANIEL MULLAN
THEODORE F. MAY
HUGO BAUER
BY

ATTORNEY

Oct. 18, 1955 D. MULLAN ET AL 2,720,690
APPARATUS FOR THREADING BASES ON
THE LEADS OF FLUORESCENT LAMPS
Filed April 6, 1951

INVENTORS.
DANIEL MULLAN
THEODORE F. MAY
HUGO BAUER

United States Patent Office 2,720,690
Patented Oct. 18, 1955

2,720,690

APPARATUS FOR THREADING BASES ON THE LEADS OF FLUORESCENT LAMPS

Daniel Mullan, Hillside, Theodore F. May, Verona, and Hugo Bauer, Newark, N. J., assignors to Westinghouse Electric Corporation, East Pittsburgh, Pa., a corporation of Pennsylvania Application April 6, 1951, Serial No. 219,606

12 Claims. (Cl. 29—25.19)

This invention relates to an automatic high-speed machine for assembling the parts of fluorescent lamps and the like and, more particularly, to that part of the machine which threads bases on the leads of such lamps while the latter are on a conveyor between the exhaust machine and the basing machine.

The principal object of our invention, generally considered, is to automatically, first, roughly straighten the leads at the top of a fluorescent lamp, while the bulb thereof is held with its axis vertical, and then more accurately bring them in line with a funneling device for insuring that said leads are threaded into the apertures in the pins of a base for said lamp, with the base finally left in position on the top of such lamp.

Another object of our invention is to provide base-threading mechanism for fluorescent lamps, comprising a preliminary and final wire positioner, a bulb centralizer, and a threader, whereby the top leads of each lamp are first straightened, then at another indexed position the bulb is accurately centralized beneath a threading mechanism, and the leads accurately guided into apertures in the pins of the base, handled by suction means, so that said base is finally left in position at the top of the lamp, with the lead wires extending through the contact pins thereof.

A further object of our invention is to provide apparatus for threading bases on the leads of tubular lamps, comprising a conveyor for moving and indexing said lamps from one station to another while held in upright positions, a wire positioner for at a certain station drawing the uppermost of the leads of an indexed lamp upwardly to approximately vertical positions, means at a subsequent station for centralizing said lamp, and threading means, including a funneling device at the same station for, while the lamp is centralized therebeneath, drawing said upper leads upwardly to bring them within the range of said funneling device, means for picking up a base with apertured contact pins, moving it down over said funneling device, so that the leads are pushed through the pin apertures, means for then releasing tehe base to leave it on the upper end of said lamp, means at a subsequent station for bending over the leads to hold the base temporarily in position on said lamp, means at a subsequent station for reversing said lamp end for end, and means for successively repeating on the other end of said lamp the operations which took place prior to reversing it.

A still further object of our invention is to provide apparatus, such as described as a further object, but operating at the bottom of such tubular lamps instead of the top, either simultaneously with apparatus at the top, or sequentially with such apparatus.

An additional object of our invention is to provide a method of applying a base on the top and/or bottom of a fluorescent lamp, held with its axis vertical, comprising indexing said lamp after straightening its leads to some extent so that said leads extend vertically therefrom rather than laterally, bringing a plunger or plungers to a base or bases with apertured contacts and holding it or them by suction means, moving said base or bases toward said lamp, closing arms about the leadwires without pinching, to gather the two wires and lead them so that they fall within the area of funneling means, the wires move through apertures in the base contacts, and the ends of the wires project beyond the ends of said contacts, stopping the movement of the plunger or plungers while allowing the lead-moving arms to open until they clear the base or bases and allow it or them to come to rest on the end or ends of said lamp, cutting off the vacuum to leave the said base or bases in position with respect to said lamp end or ends, reversing the lamp end for end, if a base has not been applied to both ends, and repeating the operations at the other end of said lamp.

Other objects and advantages of the invention, relating to the particular arrangement and construction of the various parts, will become apparent as the description proceeds.

Referring to the scale drawing.

After fluorescent lamps have been exhausted and tipped off, it is desired to automatically apply bases thereto in order to avoid the necessity of tediously threading the leads of such fluorescent lamps through the base contact pins. We have devised a machine for automatically effecting this operation. The mechanism for the purpose is attached to a conveyor carrying lamps while held in vertical positions, from the exhaust machine to the machine for cementing the applied bases to the lamps. In one embodiment illustrated, means are provided for bending the leads at the top end of a lamp, from a diagonally extending downturned position, as received from the exhaust machine, first to a diagonally upturned position, and then to an approximately vertical position.

The lamp is then centralized, that is, held in a position where its axis coincides with that of the threading mechanism, at the station underlying said mechanism. At such station, a base carrying the cement used for connecting it to a lamp bulb, is delivered, as by sliding down an inclined chute, for example. It then passes under a vacuum plunger, reciprocating in a head which also reciprocates, and which carries lead wire straightening and threading arms or jaws. If there is no lamp at the station "8," or that just before where a base is to be threaded on lead wires thereof, a "skip-detector" operates to prevent feeding of a base. After the base, if fed, has been picked up by the vacuum plunger, it is slightly raised, the plate on which it is carried to position beneath said plunger is withdrawn, the head and jaws carried thereby descend toward the centralized lamp therebeneath, the jaws close about the upstanding leads at the top end of said lamp, the head moves up while the jaws close tight about said leads, straightening the latter and bringing the ends thereof to the ends of funneling portions of the jaws.

The plunger then descends, carrying the base and pushing the apertured contact pins thereof directly over the extreme tips of the lead-funneling portions of the jaws. The whole assembly then moves down, causing the leads to pass into the hollow contact pins of the base, until finally they extend out of the top ends thereof. The jaws then open, and the plunger descends therebetween, placing the base on the top end of the lamp. The vacuum is then released, allowing the plunger to rise, while leaving the base in place on the top end of the lamp, with the leads extending beyond the ends of its contact pins.

Figure 24:
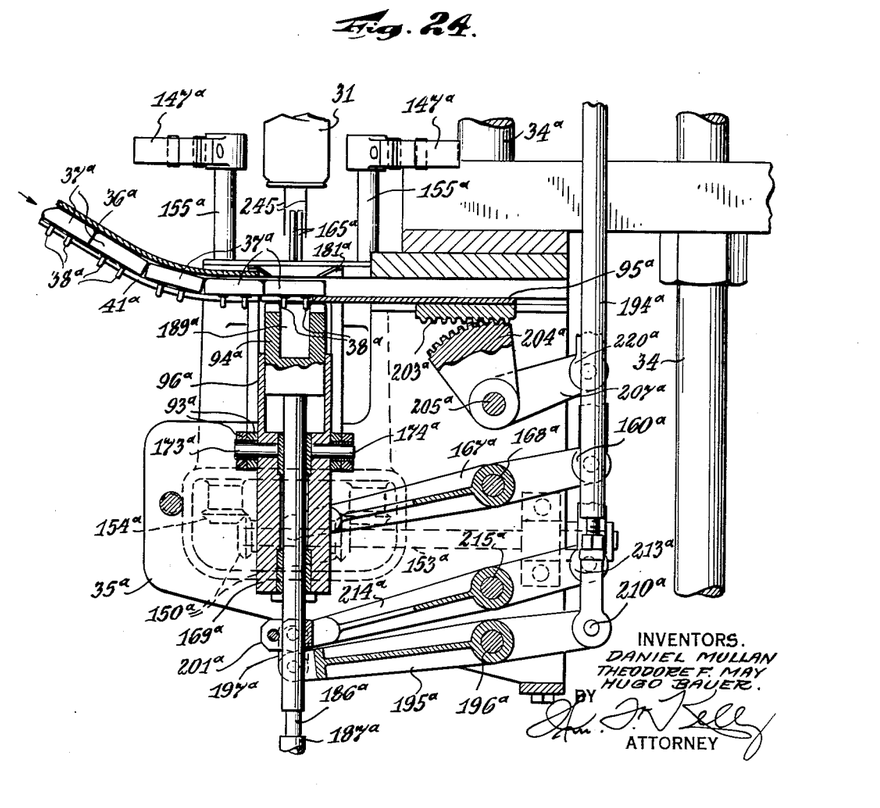
Figure 24 is a view corresponding to Figure 2, but showing a modification.

At a subsequent station, these leads which project beyond the ends of the contact pins are bent over to prevent the base from dropping off the lamp during a later operation. The lamp then passes to another station where it is reversed end for end, either manually or automatically by means of a machine to be identified. After reversal, the other end of the lamp is processed in a similar manner, whereupon the lamp passes on to have the bases sealed thereto and other operations performed thereon. In the embodiment of Figure 24, reversal of the lamp is obviated by threading a base to the lower end.

Figures 5, 6:
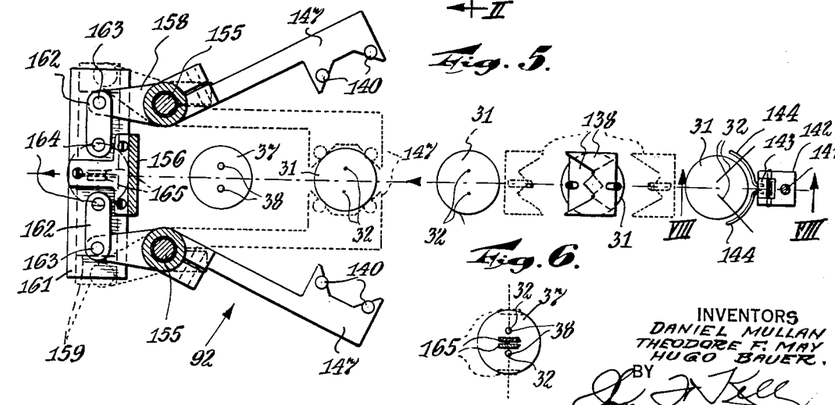
Figure 5 is a fragmentary horizontal sectional view on the line V—V of Figure 3, in the direction of the arrows.
Figure 6 is a fragmentary horizontal sectional view on the line VI—VI of Figure 3, in the direction of the arrows.

Referring to the drawing in detail, like parts being designated by like reference characters, and first considering the embodiment illustrated in Figures 1 to 23, inclusive, there is shown a conveyor for supporting and transporting a series of electrical devices. These are illustrated as fluorescent lamps 31, which have been tipped off and had the lead wires 32 bent over so that the top wires extend diagonally downward and to the right as shown most clearly in Figures 3 and 5. There is provided a frame for supporting said conveyor with said lamps, drive means for causing movement of said conveyor to index said lamps, one by one, from station to station, mechanism for effecting a lead-wire straightening, mechanism for centralizing the bulb of the lamp, mechanism for threading the leads at the top end of the lamp through the apertured contact pins of a base, mechanism for bending over the portions of the leads which project beyond the extreme ends of said contact pins, mechanism for turning the lamp end for end, and mechanism similar to that first outlined for repeating the operations on the other end of the lamp.

*Lamp conveyor and frame*

Figures 2, 7:
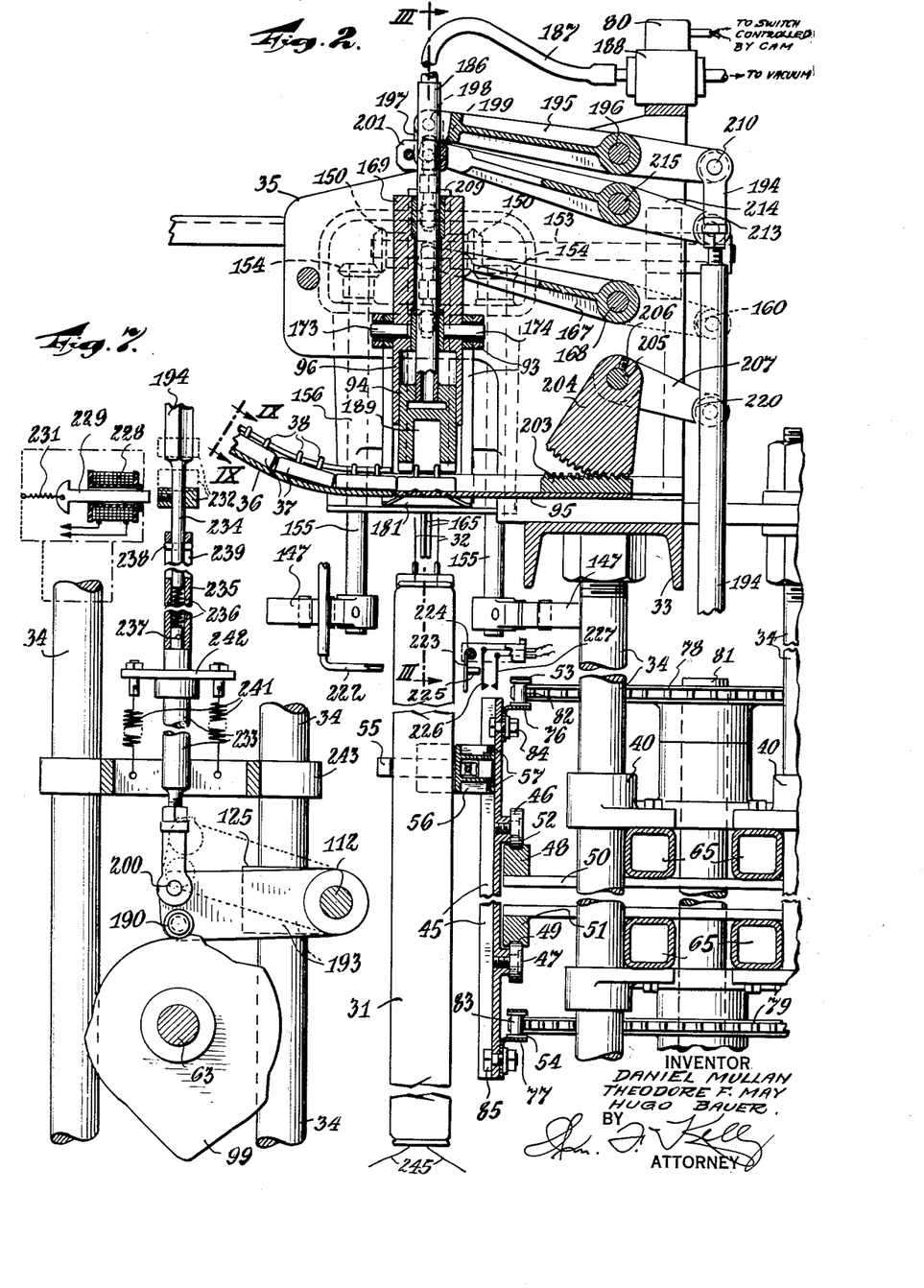
Figure 2 is a fragmentary transverse sectional view on the line II—II of Figure 3 in the direction of the arrows.
Figure 7 is a fragmentary transverse sectional view on the line VII—VII of Figure 1, in the direction of the arrows, but on a larger scale.

The frame of the present embodiment comprises a table which extends the length of the machine and may be in the form of a channel member 33, as shown in Figure 2, with the web at the top and the flanges projecting downwardly. This channel member 33 is supported from the floor by a plurality of legs 34, braced by longitudinal members 65 carrying brackets 40 through which said legs extend. Upstanding from the member 33 is a threader housing 35 carrying shafts, which will subsequently be described in detail, on which are mounted levers which effect the desired operations.

Figure 9:
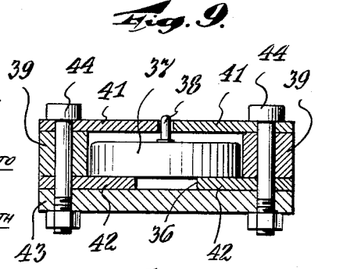
Figure 9 is a fragmentary transverse sectional view on the line IX—IX of Figure 2, in the direction of the arrows, but on a larger scale.

Connected to the channel member 33 is a chute 36 along which bases 37 with their contact pins 38 upstanding therefrom are fed, either by hand or by desired automatic means (not shown). In order that said bases may be fed with their contact pins 38 lying in a plane transverse to the machine, the chute 36 comprises side members 39 and top members 41. These are connected to bottom members 42 and braces 43 by means of bolts 44, as shown mostly clearly in Figure 9. The top members 41 are spaced from one another a distance only slightly greater than the diameter of the pins 38, so that said bases as delivered are oriented, with the pins in the approximate transverse plane of the machine.

The conveyor for the lamps 31 comprises a series of vertical slats or channel members 45, each carrying rollers 46 and 47 pivoted thereto, the former of which travels in a track member 48 supported on cross braces 50 extending from the frame members 65, and the latter of which rides in a corresponding lower groove 49 in a similar track member 51. This means that each channel member is supported for travel on an upper track member 48 and prevented from getting out of the upper groove 52 thereof by a lower roller riding in a lower groove 49 of a lower track member 51. These track members extend along the front and back of the machine. At both ends the channel members 45 and their carried lamps 31 are supported by chains 53 and 54. The lamps may travel right to left, as viewed in Figures 1 and 3, from one end to the other along the front to the back of the machine, the lamps being loaded, say at station "1" and unloaded after desired processing.

Each channel member 45 is also provided with a pair of spring actuated lamp-gripping hooks 55, so shaped that a lamp may be pushed therebetween into engagement with shock-absorbing bumpers (not shown) and held in place until forcibly pulled therefrom. Such hooks, described in detail and claimed in the D. Mullan and H. Bauer application, Serial No. 215,603, filed March 14, 1951, are mounted on a block or base 56 secured to its channel member 45 by screws or the like 57.

Drive mechanism

The power means for the conveyor comprises a motor or other prime mover 58 driving, through reduction gearing 59, a chain 61 passing over a sprocket wheel 62 mounted on a cam shaft 63. The shaft 63 is carried by bearings 64 supported on the longitudinal frame members 65 of the machine to which the legs 34 are connected, as shown most clearly in Figures 1 and 2. The shaft 63 carries at one end a cam 66 in which rides a roller 67 on a lever 68, pivoted at 69 to the frame of the machine. The free end of the lever 68 is connected to link 71 by pin 72. The other end of the link is connected to a crank 73 by pin 74.

The crank 73 is mounted on a vertical shaft 75 carrying sprocket wheels over which the chains 53 and 54 pass and to which the series of channel members 45 are connected as by means of angular clips 76 and 77. The chains 53 and 54 also, respectively, pass over sprocket wheels 78 and 79 on a shaft 81 at the other end of the machine. The shaft 75 and its sprocket wheels are generally like the shaft 81 and its sprocket wheels 78 and 79. The clips 76 and 77 are connected respectively on the one hand to pivot pins 82 and 83 of the chains 53 and 54, and on the other hand by bolts 84 and 85 to the series of channel members 45.

The shaft 75 also carries a ratchet 86 engaged by a pawl 87 connected to the crank 73 by pin 88, and spring-biased toward said ratchet, whereby reciprocation of the link 71 at each revolution of the shaft 63 turns the shaft 75 sufficiently to move, through the chain of mechanism described, each lamp supporting channel from one station to the next. A pawl 89 on the frame member 65, spring biased toward the ratchet 86 is provided to hold said ratchet in a station position while the crank 73 is being returned preparatory to making the next indexing movement.

The shaft 63 also carries a sprocket wheel, or other desired means, for positively driving in synchronism therewith, the lamp-turning mechanism 91, only diagrammatically shown. The drive may be through chain or other suitable means (not shown) as in a manner similar to that described and claimed in the D. Mullan and H. Bauer application, previously referred to. Said application also describes in detail a preferred form of lamp-turning mechanism.

Figure 1:
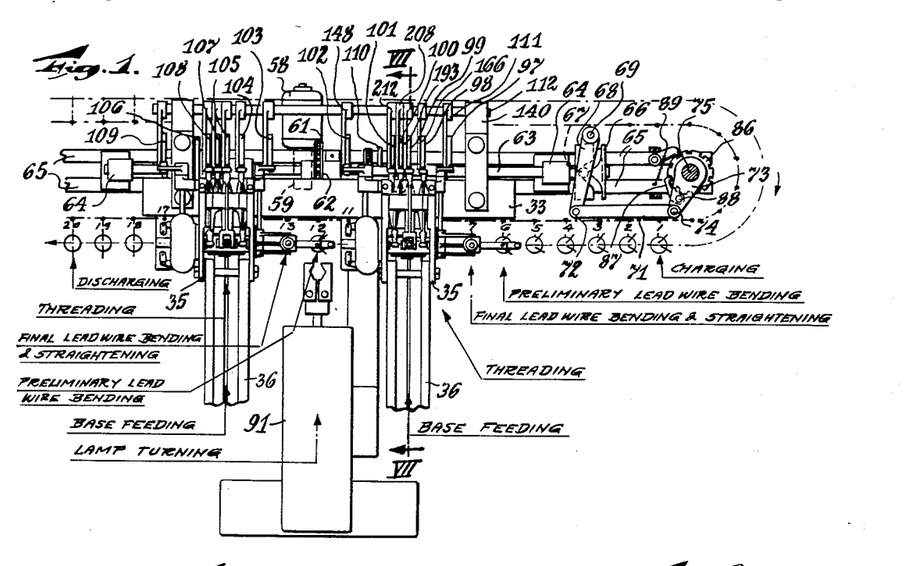
Figure 1 is a plan view of apparatus embodying our invention.

The shaft 63 carries a series of cams, shown in Figure 1, for respectively operating the preliminary lead wire straightening mechanism 90, the bulb centralizer 92, the base threader jaws or arms 93, the base holding plunger 94, the switch (not shown) for energizing the solenoid 80 which controls the vacuum line to said plunger, the base releasing slide plate 95, and the threading head 96 which carries the jaws and in which the base plunger reciprocates. These cams are designated 97 for the preliminary lead-wire straightening mechanism 90; 98 for the threader jaws 93; 99 for the base holding plunger 94; 110 for the solenoid switch; 100 for the base releasing plate 95; 101 for the threading head 96; and 102 for the bulb centralizer 92. All of these cams are of the peripheral type, shown in detail for only cam 99 in Figure 7, and operate on rollers carried by arms or levers pivoted on cam lever shaft 112.

Similar cams 103, 104, 105, 106, 107, 108, and 109 serve to, respectively, operate the preliminary lead wire straightening mechanism, the threader jaws, the base plunger, the solenoid-energizing switch, the base release plate, the threading head, and the bulb centralizer of the mechanism, at the left of the lamp-turning mechanism 91, as viewed in Figure 1. This mechanism corresponds respectively, with the preliminary lead-wire straightener 90, the threader jaws 93, the base holding plunger 94, the switch for energizing the solenoid 80, the base releasing plate 95, the threading head 96, and the bulb centralizer 92 to the right of said lamp turning mechanism, and which handles the lamp after being turned end for end to perform operations on the opposite end thereof. Only the devices at the right of said lamp-turning mechanism will be described in detail, as those to the left are identical therewith.

Preliminary and final lead-wire straightening

The preliminary and final lead-wire bender and straightener 90 is operated by the cam 97 through lever 111 on cam lever shaft 112. The shaft 112 is held by brackets 125 carried by legs 34. This lever carries at its end a roller riding on said cam 97, so that said lever oscillates about the shaft 112 in the proper manner for effecting the operations desired. An operating rod 113 has its lower end pivoted to the operating lever 111. The upper end of said rod 113 is pivoted by means of a pin 114 to a crank 115 on a shaft 116. Said shaft also carries a pair of cranks 117, the free ends of which are bifurcated, as indicated at 118, to receive the ends of a pin 119 extending from operating rod 121 formed with upwardly-opening cavity 160.

The pin 119 passes through slots 170 in rod 121 and relatively short slots 122 in the hollow operating sleeve 123. Its ends are received in relatively long slots 120 in the supporting bracket 124. The sleeve 123 reciprocates in the bracket 124 mounted on the housing 35 in which the head 96 reciprocates. The bracket 124 also carries the shaft 116. Movement of the rod 121 in sleeve 123 before movement of the sleeve in the bracket 124 is effected by friction blocks 126 and 127 mounted in the bracket 124 and pressed against said sleeve by spring 128 held in place by bolt 129 secured to said bracket.

The pin 119 is normally held in the upper ends of slots 170 by coil spring 131, the compression of which is adjusted by a rod 132, the upper end or head of which engages the lower end of said spring. The lower end of said rod is adjustably threaded into the lower end of the rod 121, as indicated at 133. The lower end of said rod 121 has teeth 134 cut thereinto forming racks meshing with pinion segments 135, carried on shafts 136 pivoted to a head portion 137 mounted on the lower end of the operating sleeve 123. These pinion segments carry final wire straightening jaws 138 which swing between full and dotted line positions, as shown in Figure 3.

Figure 8:
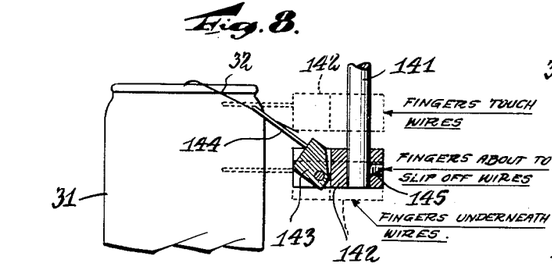
Figure 8 is a fragmentary longitudinal sectional view on the line VIII—VIII of Figure 5, in the direction of the arrows, but on a larger scale.

The operating sleeve 123 also carries an arm 139 from which depends a rod 141 carrying a head 142. To said head is pivoted a block 143 from which project arcuate fingers 144, as shown in detail in Figures 5 and 8. The head 142 is adjustably connected to the rod 141 by means of a set screw 145. The purpose of the fingers 144 is to lift up the lead wires 32 on a lamp 31 when at station "6," from the initial downwardly-bent and right-hand extending direction shown in Figure 3, to more nearly upright where at station "7" the jaws 138 effect further straightening and raising thereof. The jaws 138 are closed and opened by relative movement of the rod 121 between the lowermost position, where its collar 146, adjustably held thereon by set screw 130, engages the top of the operating sleeve 123, and a position where the pin 119 engages the upper end of the slots 120.

Raising and lowering of said jaws, in addition to opening and closing movement, is effected by vertical reciprocation of the sleeve 123, throughout the extent of movement allowed by the slots 120 in the bracket 124. Thus, as the arm 117 swings down, from the position shown in Figure 3, the jaws 138 are first opened by relative movement of the rod 121 in its sleeve 123, from the upper full line position to the upper dotted line position. Then, after the pin 119 has traversed the slot 122 in the sleeve 123, the latter is moved downwardly therewith, causing the head portion 137 to move from the full to the dotted line position, carrying the jaws 138 therewith to positions on opposite sides of the upper portion of the lamp 31 indexed therebeneath. The spring 131 is a safety feature, allowing some downward movement of the pin 119, from the position shown in Figure 4, without breakage of the parts even if movement of the jaws 138 is prevented, as by an obstruction.

Figures 3, 4:
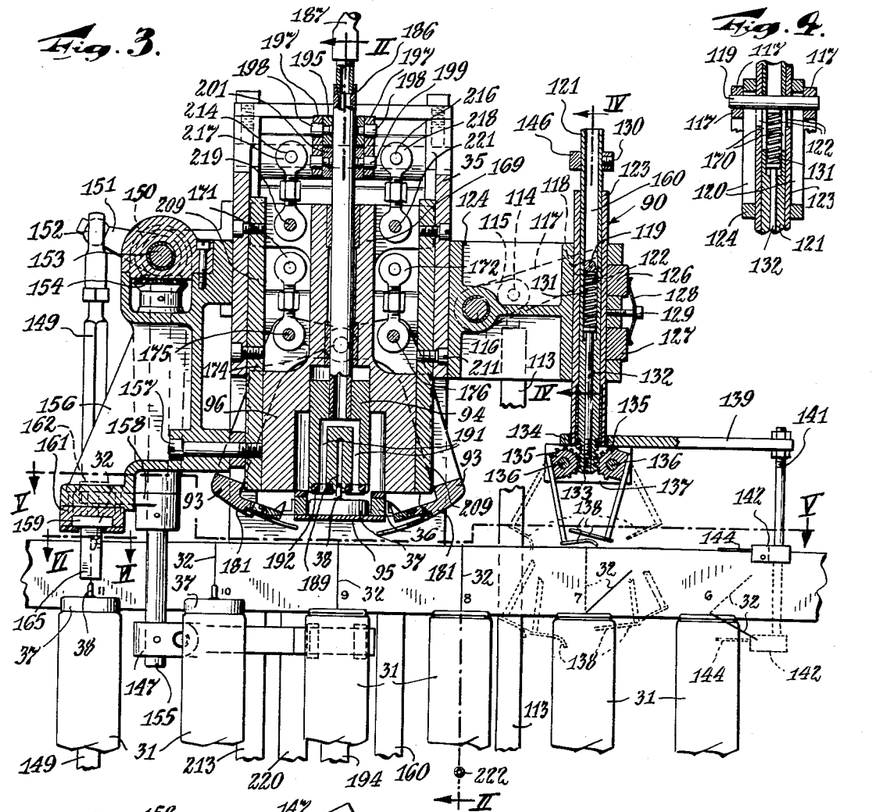
Figure 3 is a vertical longitudinal sectional view on the line III—III of Figure 2, in the direction of the arrows, showing the parts as positioned with the lead-threading jaws open and after a base has just been placed under the handling plunger.
Figure 4 is a fragmentary vertical sectional view on the line IV—IV of Figure 3, in the direction of the arrows.

As the operating cam rotates further, the arm 117 is swung back from lower position to the position shown in Figure 3. The jaws 138 first start to close toward the lamp and are so adjusted that they pick up the leads 32 and draw up thereon, finally reaching the full-closed position shown in full lines on Figures 3 and 5, where said leads are held in approximately vertical positions. As an alternate, two cams may be employed; one for effecting opening and closing of the jaws 138, and the other for vertically reciprocating the sleeve 123.

The bulb centralizer and lead bender

When the lamp, after passing through idle station "8," is indexed at station "9," its bulb is "centralized" by being gripped between jaws 147 of the centralizing apparatus 92. These jaws are desirably provided with rubber or other shock-absorbing insets 140. The apparatus is operated by the cam 102 through lever 148 on shaft 112. This lever carries at its end a roller riding on said cam 102, so that said lever oscillates about the shaft 112 in the proper manner for effecting the operations desired.

An operating rod 149 has its lower end pivoted to the lever 148. The upper end of said rod 149 is pivotally connected to a crank 151 as by ball and socket joint 152. Said crank is fixed on operating shaft 153 carrying bevel gears 150 respectively meshing with corresponding bevel gears 154 on vertical shafts 155. These shafts are mounted in bearings provided in bracket 156 secured to the housing 35 as by means of bolts 157. The lower end of each shaft 155 carries one of the jaws 147, so that as the cam 102 rotates, the jaws which are in the full line or open position when the lamp 41 is indexed at station "9," are thereupon closed to the dotted-line position illustrated in Figure 4.

It is possible to effect this centralizing by virtue of the fact that each lamp 31 is held only in one place, that is, by the lamp gripping hoops 55. These hooks allow some slight rotation thereabout to the exact position desired for the threading of the lead wires through the hollow contact pins of an associated base. The jaws 147 also carry extensions 158 connected to lead-bending elements 159 sliding in a guide member 161 carried by the bracket 156. The connection between the extensions 158 and said members 159 is through links 162. The outer ends of the links 162 are connected to the extensions by pins 163 and the inner ends are connected to said lead-bending elements by pins 164. Each lead-bending element has a depending extension 165 which normally lies between the upstanding leads 32 at Station "11" so that, as a lamp at station "9" is being centralized, a lamp indexed at station "11" simultaneously has its upstanding leads drawn apart and bent over, thereby insuring that the lamp when turned end for end does not lose its bast by having it drop off its lead wires.

The threader jaws

The threaded jaws 93 are caused to open and close by cam 98 through lever 166 on shaft 112. This lever at its end carries a roller riding on said cam 98, so that said lever oscillates about the shaft 112 in the proper manner for effecting the desired operations. An operating rod 160 has its lower end pivoted to the operating lever 166.

The upper end of said rod 160 is pivoted to the right hand end of a lever 167 mounted on a shaft 168, held in the housing 35.

The other end of the lever 167 is bifurcated to straddle the upwardly extending stem 169 of the threading head 96. The bifurcations are pivotally connected to depending links 171 and 172 which serve to operate the threader jaws 93. Said jaws for that purpose are pivoted on studs 173 and 174 extending from the threading head 96. The lower ends of the links 171 and 172 are, respectively, connected to said jaws 93 by pins 175 and 176. Oscillation of the lever 167 about its pivot member 168, therefore, imparts corresponding opening and closing movement to the jaws 93 about their pivot points 173 and 174.

Each jaw 93 is formed as two bell crank portions 177 and 178 (Fig. 10), connected at their lower ends as by means of set screws 179 to a straightening and threading element 181. Each of these elements 181 comprises a threader portion 182 and a directing or gathering portion 183. The former is connected to the element 181 by rivets 184 and the latter to said element by set screws 185, as shown most clearly in Figures 10, 11 and 20.

The base holding plunger

The base plunger 94 is mounted to reciprocate in the threading head 96. It carries a hollow extension 186 connected through a rubber or other flexible tube 187 and solenoid-operated valve 188 to a source of vacuum, such as a pump (not shown). The solenoid 80, controlling said valve, is energized and deenergized by a switch (not shown), which is in turn opened and closed at the proper times by a cam 110 on shaft 63.

The lower portion of the plunger 94 has a downwardly-opening pocket 189 to receive the upstanding hollow contact pins 38 of a base 37 indexed therebeneath. It also has a pair of ports 191, communicating with the interior of the extension 186, the lower ends of which are lined with "neoprene" or synthetic rubber rings 192 so that, upon engaging a base 37 when vacuum is applied to said ports through the pipe 186, said base will adhere thereto.

Reciprocation of the plunger 94, as shown in Figures 2, 3 and 7, is effected by cam 99 through lever 193 on shaft 112. This lever at its end carries a roller 190 riding on said cam 99 so that, as the cam turns, said lever oscillates about the shaft 112 in the proper manner for effecting the desired operations. An operating rod 194 has its lower end pivoted to the lever 193, as indicated at 200. The upper end of said rod is pivoted to the right hand end of a lever 195 mounted on a shaft 196 held in the housing 35, as indicated at 210.

The left hand end portion of the lever 195 is bifurcated, and the bifurcations thereof are respectively connected to links 197 by means of pintles 198 outstanding therefrom. The lower ends of the links 197 are, in turn, pivotally mounted on pintles 199 outstanding from a collar 201 secured to extension 186 of the plunger 94. Thus, oscillation of the lever 195 about its pivot 196 under the influence of the cam 99 effects the desired reciprocation of the plunger 94 in the head 96.

Base release plate

If a lamp is at station "8" and a base 37 feeding to the machine at station "9" is thus accepted, it slides directly beneath the plunger 94, as shown most clearly in Figure 2, where it rests on a supporting plate 95, slidable in the base portion of the housing 35 and carrying on its upper surface a rack 203. The left hand end portion of the plate 95 has bifurcations 230 (Fig. 14) sufficiently spaced to allow a base to pass therebetween. This rack 203 is engaged by a pinion segment 204, secured to a shaft 205, as by set screw 206. Said shaft is, in turn, pivotally mounted in the housing 35 and carries a crank 207 fixed thereto, the free end of which is pivoted to the upper end of an operating rod 220.

Said operating rod is reciprocated by cam 100 through lever 208 on shaft 112. This lever at its end carries a roller riding on said cam 100, so that said lever oscillates about the shaft 112 in the proper manner for effecting the desired movement of the plate from and to the supporting position of Figure 2, where the bifurcations 230 straddle the lower end portions of reduced width of the bottom members 42 of the chute 36. The operating rod 220, whose upper end is pivoted to the crank 207, has its lower end pivoted to said operating lever 208.

The threading head

The threading head 96 has its side portions grooved to receive guides 209 connected to the inside surfaces of the housing 35, as by means of screws 211, so that it reciprocates vertically in said housing. Motion is transmitted thereto from cam 101 through lever 212 on shaft 112. This lever, at its end, carries a roller riding on said cam 101, so that said lever oscillates about the shaft 112 in the proper manner for effecting the desired operations. An operating rod 213 has its lower end pivoted to the operating lever 212.

The upper end of said rod 213 is pivoted to the right hand end of a lever 214, keyed or otherwise secured to the shaft 215 pivoted to the housing 35. The shaft 215 also carries a crank 216, keyed or otherwise secured thereto, so that reciprocation of the rod 213 effects corresponding oscillation of both the lever 214 and the crank 216.

Pivoted, respectively, on the ends of the members 214 and 216, are links 217 and 218. The lower ends of said links are connected to the threading head 96 by pivot members 219 and 221. Thus, turning of the cam 101 effects appropriate reciprocation of the threading head 96.

The skip detector

If, for any reason, there is no lamp at station "8," compressed air always blowing from pipe 222, instead of being deflected by such a lamp, impinges directly on a plate 223 pivoted at 224 to the frame of the machine. Said plate 223 carries a transverse extension 225 which is then caused to engage switch element 226, pushing it into contact with switch element 227 and closing a circuit, including a suitable source of electrical power, through solenoid 228, shown in Figure 7. This causes the armature 229 to move to the right against the action of its spring 231.

Said armature 229 thus passes to a position beneath the collar 232, when in upper or dotted line position. Said collar 232 is mounted on an extension of operating rod 194, thereby preventing downward movement of said rod when the oeprating cam 94 would otherwise permit it, and failing to raise the base plunger 94 from the path of movement of an incoming base, whereby no base is then received beneath said plunger.

Even if the skip detector operates to prevent feeding of a base 37 beneath the plunger 94, this engagement between the roller 190 and cam 99 is still effected by making the lower portion 233 of the operating rod 194 separate from the main portion of said rod. A reduced extension 234 on the rod 194 fits in a pipe or hollow connector 235, with its lower end engaging a spring 236 in said connector. Withdrawal of the extension 234 from the connector 235, secured to the lower rod portion 233 as by means of a rivet or bolt 237, is prevented by a key or pin 238 passing through said extension and with its ends received in slots 239 in said connector.

The lower portion 233 and the roller 190 on the lever 193 are biased toward the cam 99 by springs 241 acting between a collar 242 thereon and a transverse frame member 243 secured to the legs 34. This means that when the skip detector operates, the lower portion 233 rides up and down on the extension 234 of the upper member 194, without operating the base plunger 94 and allowing a base to feed therebeneath for application to a lamp at the succeeding station "9." Although not illustrated, it will be understood that all of the elements which are directly engaged by cams, such as the cam-engaging rollers on the levers and the operating rods 113, 149, 160, 213 and 220, respectively connected thereto, are desirably spring-biased toward the respective cams in a way similar to that illustrated for the roller 190, the lever 193, and the rod portion 233.

Operation

From the foregoing description of the apparatus for effecting threading of bases on the leads of fluorescent lamps, it will be seen that the machine normally operates as follows:

1. Bases 37, to the interior of which has been applied basing cement, are disposed in the feeding chute 36, but prevented from passing beneath base plunger 94 because of the absence of a lamp at station "8," causing the operating rod 194 to be held up by the armature 229, and the plunger correspondingly held down to prevent feeding of a base thereunder.

2. A fluorescent lamp 31, otherwise completed as by exhausting and tipping off, but having no bases on the ends thereof, is placed by an operator between the jaws 55 on the conveyor, say at station "1" of the machine as seen in Figure 1. When first applied, the leads at both top and bottom project diagonally to the right and respectively upwardly and downwardly. Charging of lamps on the conveyor at each indexing movement is continued.

3. When a lamp reaches station "6" assuming that the machine is being driven and the cams rotating normally, it has its top leads 32 bent upwardly from diagonally downturned position to a diagonally upturned position by the preliminary lead bending fingers 144. These fingers on downward movement slip by said leads, by rising to the position shown in full lines in Figure 8. On upward movement, the fingers 144 pull said leads 32 therewith to the position shown by dotted lines in Figure 3.

4. At station "7," the leads 32 are moved from the diagonal right extending position, shown in full lines in Figure 3, to the vertical position shown in dotted lines, by upward movement of the final lead-wire straightening jaws 138, upon the moving upward from the dotted to the full line position.

5. Upon reaching station "8," each lamp deflects the stream of air issuing from pipe 222, so that the switch elements 226 and 227 separate, opening the circuit through solenoid 228 and releasing the collar 234. This allows the base plunger 94 to be raised and a base 37 to be fed, ready for application to a lamp 31 when it reaches the next station.

6. On reaching station "9," the position of the parts is first as represented in Figure 3, the newly-placed base 37 being directly under the plunger 94, the threader jaws 93 being open and the other threading parts raised. Almost immediately, however, the jaws 147 start to close about the lamp to hold it centralized during the complete threading operation. This is effected by a high dwell on the cam 102 extending a sufficient distance around its circumference to cause the jaws 147 to grip the lamp except while being indexed and removed.

Figure 12:
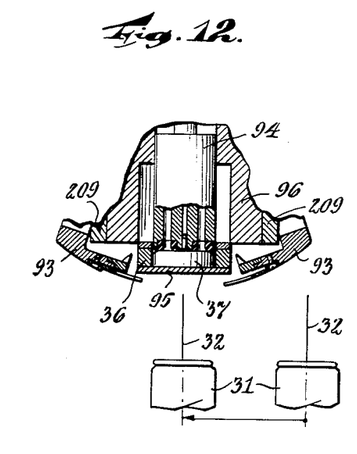
Figure 12 is a fragmentary longitudinal sectional view, corresponding with a portion of Figure 3, but showing a subsequent position of the parts where the lamp has just indexed and the plunger descended 9/32" with the vacuum on to hold said base against the bottom face of said plunger.

7. With a lamp at station "9," the base holding plunger 94 descends a slight distance ($3/32''$) from the position of Fig. 3, to that shown in Fig. 12, the solenoid 80 being energized to open the valve 188 and apply vacuum to said plunger so that the base 37 adheres thereto. This is effected by having a short high dwell on the cam 99, positioned to correspond with the beginning of closing movement of the centralizer jaws 147.

Figures 13, 14:
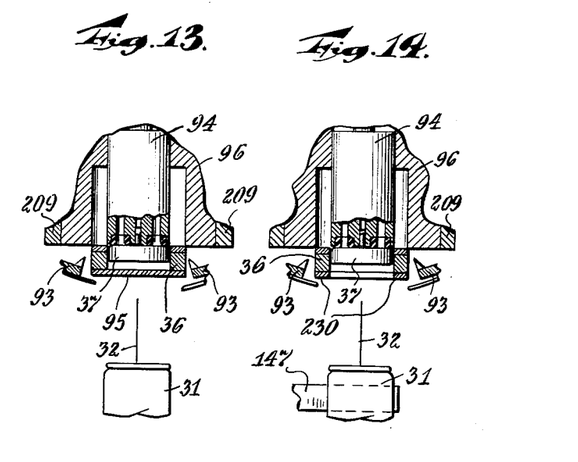
Figure 13 is a view corresponding to Figure 12, but showing a subsequent position in which the plunger and the lamp base have been raised 1/8".
Figure 14 is a view corresponding to Figure 13, but showing a subsequent position in which the plate, which initially held the base, has been withdrawn, and a lamp has been centralized therebeneath.

8. As shown in Figure 13, the plunger 94 then rises a short distance ($1/8''$) lifting the base therewith. This is effected by having a short low dwell on the cam 99 positioned to correspond with the ending of the closing movement of the centralizer jaws 147.

9. Then the base supporting plate 95 is moved to the right, as viewed in Fig. 2, by operation of the cam 100, causing corresponding movement of the pinion segment 204 and its meshing rack 203. This clears the way, as shown in Figure 14, for downward movement of the base 37 to be threaded on the upstanding leads 32 of the lamp 31 indexed and centralized therebeneath.

10. In the next position, represented in Figure 15, the threading head 96 and its threader jaws 93, the latter being separated, have descended 1⅛".

Figures 15, 16, 17, 18, 19, 20:
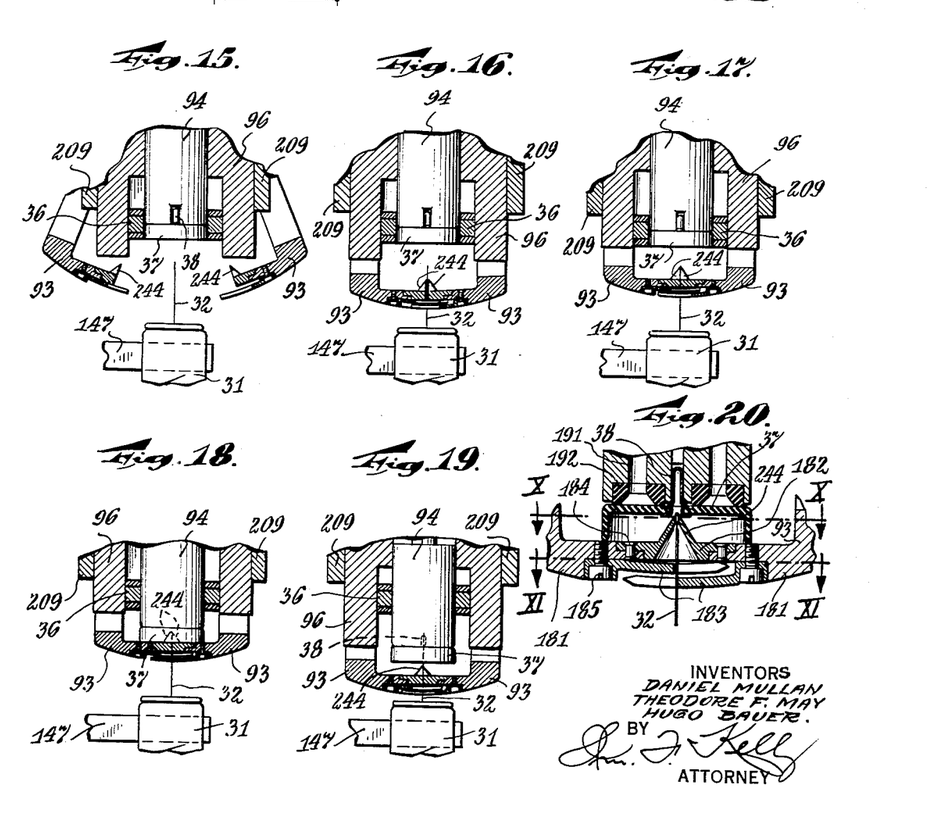
Figure 15 is a view corresponding to Figure 14, but showing a subsequent position in which the lamp basing head and associated lead-threading jaws have descended 1 1/8".
Figure 16 is a view corresponding to Figure 15, but showing a subsequent position in which the threading arms have been brought together about, but not quite into tight engagement with the leads of the centralized lamp therebeneath.
Figure 17 is a view corresponding to Figure 16, but showing a subsequent position in which the head has moved up with the jaws closed tight about the leads.
Figure 18 is a view corresponding to Figure 17, but showing a subsequent position in which the plunger has descended to bring a base to the funnel portion of the threading jaws.
Figure 19 is a view corresponding to Figure 18, but showing a subsequent position in which the whole assembly has been moved down to perform the operation of threading a base on the leads of a lamp.
Figure 20 is a view with the parts in the position of Figure 18, but showing all of said parts in vertical section and on a larger scale.

11. Next, as shown in Figure 16, the threader jaws 93 are caused to swing together to a position close to (within 1/32", for example) but not gripping the leads tightly.

12. As shown in Figure 17, the threading head 96 then moves up while the jaws 93 close tightly about the leads drawing them up ready for being threaded to the base 37 held by the plunger 94.

Figure 10:
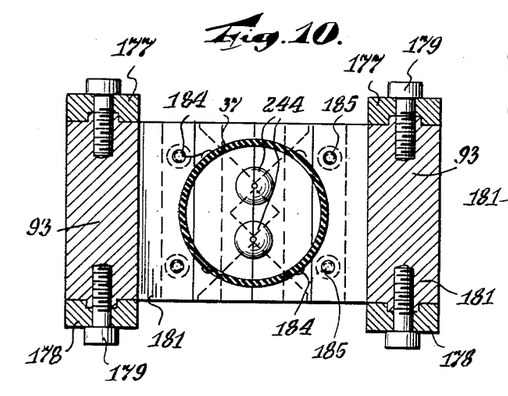
Figure 10 is a fragmentary horizontal sectional view on the line X—X in Figure 20, in the direction of the arrows.
Figure 11:
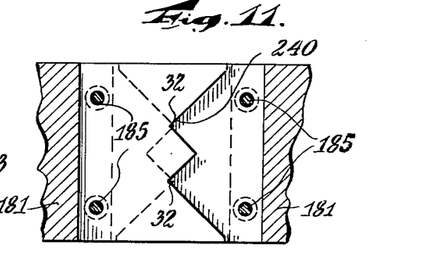
Figure 11 is a fragmentary horizontal sectional view on the line XI—XI of Figure 20, in the direction of the arrows.

13. In the next position, viewed in Figures 18 and 20, the plunger descends holding the base directly above the leads and nesting over the threading portions 182 of the jaws 93. As shown in Figures 10, 11 and 20 the leads 32 are in notches 240 of and between the guiding or gathering members 183, and have their ends in the range of the threading cones 244 formed by the portions 182. The tips of said cones 244 are directly at the inner or lower ends of the hollow contact pins 38 of the base 37.

14. Next, as viewed in Figure 19, the whole assembly moves down, causing the leads to pass up through the apertures in the cones 244 of the threading portions 182, and from there entirely through the hollow contact pins 38, extending out of the top ends thereof.

Figure 21:
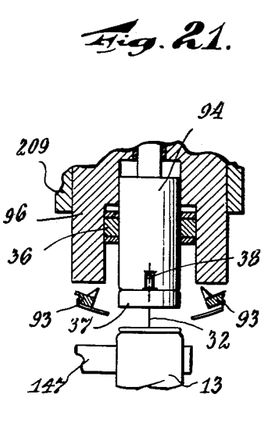
Figure 21 is a view corresponding to Figure 19, but showing a subsequent position in which the threading jaws have opened.

15. As shown in Figure 21, the jaws 93 then open, preparatory to release of the base.

Figure 22:
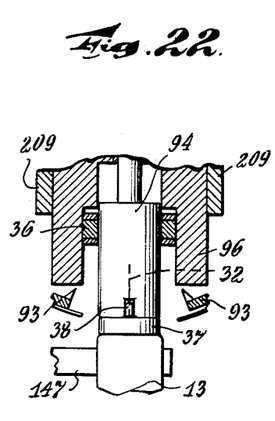
Figure 22 is a view corresponding to Figure 21, but showing a subsequent position in which the plunger has moved down to apply the base to a centralized lamp therebeneath.

16. In Figure 22, the base plunger 94 has moved down between the jaws 93, placing the base on the top of the centralized lamp therebeneath, the leads having passed further up through the hollow contact pins 38, so that they extend a considerable distance therebeyond.

Figure 23:
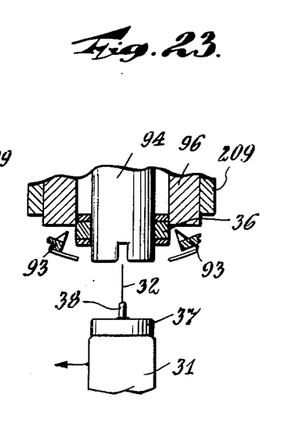
Figure 23 is a view corresponding to Figure 22, but showing a subsequent position in which the vacuum has been removed from the plunger, allowing the base to remain on the lamp, and the plunger has been raised from said lamp toward the position of Figure 3, preparatory to the reception of another base.

17. As shown in Figure 23, the solenoid 80 has been deenergized, removing the vacuum from the plunger 94, whereupon the plunger has risen leaving the base 37 in place on the lamp 31. This figure also shows where the plunger 94 stops in its upward movement if there is no lamp indexed at station "8"; thereby preventing feeding of another base until such indexing occurs.

18. The lamp is then indexed through idle station "10" to station "11" where the lead portions which project beyond the base contact pins are bent over by the depending portions 165 of the lead bending elements 159, thereby preventing the base from dropping off upon reversing the lamp end for end.

19. The lamp is reversed end for end when it reaches station "12" by the lamp turning device 91, described in detail and claimed in the D. Mullan and H. Bauer application, previously referred to. As alternatives, this turning end for end may be by hand, or entirely omitted if the apparatus disclosed in Figure 24 is employed to then, or simultaneously with the top base application, apply a base to the leads 245 depending from the lower end of the lamp 31. However, if the lamp is reversed end for end at station "12," it then at the same station has its leads 245 preliminarily bent up as occurred at station "6," in accordance with paragraph 3.

20. At station "13" the same operation will occur as occurred at station "7," only on the leads 245 at the other end of the now-turned lamp, in accordance with paragraph 4.

21. At station "15" a base-threading operation takes place on the now upper end of the turned lamp, exactly as occurred at station "9," in accordance with paragraphs 6 to 17, incl.

22. At station "17" the operation occurs of bending the leads over the contact pins on the second base, as took place at station "11" for the first base, in accordance with paragraph 18.

23. The lamp then moves on through idling stations, say those numbered 18 and 19, and is discharged or removed at station "20" for cementing of the bases to the ends of the lamp and subsequent processing.

Fig. 24 modifications

Referring now to the embodiment of our invention illustrated in Figure 24, there is disclosed a form of apparatus for threading bases on the bottom leads of fluorescent lamps. This apparatus is shown as a section, corresponding with that of Figure 2 for the first embodiment, except that it does not show as much of the framing of the machine, nor does it show any skip-detecting mechanism. It will be understood that such mechanism would not be employed with this alternative mechanism, in any event, if the application of a base to the bottom of a lamp succeeded the application of one at the top of such a lamp, as suggested in Paragraph 19. If, as also suggested, the application of a base to the bottom of a lamp simultaneous with the application to the top of the lamp, then the skip-detector disclosed in Figure 2 would work for the alternative, and in such case supplementing mechanism, like it does to the mechanism illustrated in Figure 7.

Considering the foregoing more in detail, it will be seen that the mechanism of Figure 24 is disposed below the lamps 31, rather than above such lamps as in Figure 2, and is identical with that of Figure 2 except that it is upside-down compared thereto.

This, of course, applies to the mechanism other than the chute 36a along which bases 37a with their contact pins 38a depending therefrom are fed, either by hand or by desired automatic means, not shown. The chute is otherwise like the chute 36, except that it is reversed, that is the members 41a on which the bases slide are spaced from one another a distance only slightly greater than the diameter of the pins 38a so that said bases are oriented as delivered, with the pins in the approximate transverse plane of the machine. The same conveyor and drive mechanism are employed, so need not be described.

Although Figure 24 discloses no preliminary and final lead wire straightening mechanism, yet this may be identical with the mechanism 90 except reversed and attached to housing 35a which extends below the chute 36a, rather than above the chute as in Figure 2. The cam for operating such a straightening mechanism is like the cam 97 and is carried on a similar shaft which rotates in synchronism with the operation of the conveyor. The operating rod is similar to that designated 113 in Figure 3, and like said rod spring-biased toward its cam thereabove so as not to drop out of engagement therewith. A straightening of the leads 245 at the bottom of the lamp 31 is of course a pull-down operation rather than a pull-up operation, but otherwise identical.

The bulb centralizer and lead-bending mechanism comprises centralizing jaws 147a, constructed similarly to the jaws 147 of the centralizing apparatus 92 except they are on the tops of shafts 155a instead of on the bottom of shafts 155. These shafts are mounted in bearings provided in a bracket, like that designated 156 in Figure 3, secured to the housing 35a. Said centralizing jaws are operated by a rod, like that designated 149 in Figure 3, which, however, has its lower end pivoted to a crank, like that designated 151, but on the shaft 153a. Said shaft 153a carries bevel gears 150a, respectively meshing with corresponding bevel gears 154a on the shafts 155a which carry the jaws 147a. There is a cam, like the cam 102, which through similar mechanism operates a spring-biased operating rod, like that designated 149 in Figure 3, so as to open and close the centralizing jaws 147a in the manner similar to the operation of the jaws 147.

The mechanism of Figure 24 also involves threader jaws 93ª caused to open and close by a cam, like that designated 98, through a lever on a shaft as in the preceding embodiment. An operating rod 160ª is pivoted to such a lever at its upper end and its lower end is pivoted to the right hand end of the lever 167ª mounted on a shaft 168ª supported by the housing 35ª.

The other end of the lever 167ª is bifurcated to straddle the depending stem 169ª of the threading head 96ª. The bifurcations are pivotally connected to the threader jaws 93ª, in a manner similar to that disclosed for the preceding embodiment, said jaws for that purpose being pivoted on studs 173ª and 174ª extending from the threading head 96ª. Oscillation of the lever 167ª about its pivot member 168ª, therefore, imparts corresponding opening and closing movement to the jaws 93ª about their pivot points 173ª and 174ª, each jaw being formed as disclosed in the preceding embodiment except being upside-down or reversed in position.

The base plunger 94ª is mounted to reciprocate in the threading head 96ª. It carries a hollow extension 186ª connected through a rubber or other flexible tube 187ª and a solenoid operated valve to a source of vacuum as disclosed in connection with the preceding embodiment. The upper portion of the plunger 94ª has an upwardly-opening pocket 189ª to receive the depending hollow contact pins 38ª of a base 37ª indexed thereabove. It also has a pair of ports, not shown but like the ports 191 of the preceding embodiment, communicating with the extension 186ª for having vacuum applied thereto so that the base will adhere. Reciprocation of the plunger 94ª is effected by a cam, like the cam 99 of the preceding embodiment, except that said cam is above rather than below the operating rod 194ª. Said rod has its lower end pivoted to the right hand end of a lever 195ª, mounted on shaft 196ª supported in the housing 35ª, as indicated at 210ª.

The left hand end of the lever 195ª is bifurcated and the bifurcations thereof are respectively connected to links 197ª, the upper ends of said links being, in turn, pivotally mounted on pintles outstanding from a collar 201ª secured to the extension 186ª, like the corresponding construction for the first embodiment. Thus, oscillation of the lever 195ª about its pivot 196ª under the influence of its operating cam, effects the desired reciprocation of the plunger 94ª in the head 96ª.

Upon acceptance of a base 37ª, it slides to a position directly above the plunger 94ª where it rests on a supporting plate 95ª slidable in the housing 35ª and carrying on its under surface a rack 203ª operated by pinion segment 204ª secured to a shaft 205ª and driven by a cam like the corresponding members in the preceding embodiment. Said plate 95ª also has bifurcations which straddle the lower end portions of reduced width of the bottom members 41ª of the chute 36ª and, upon withdrawal to the right, allow the base 37ª to drop therebetween.

The threading head 96ª has its side portions grooved to receive guides connected to the inside surfaces of the housing 35ª, as in the preceding embodiment, so that it reciprocates vertically in said housing. Motion is transmitted thereto from a cam and operating lever on the same shaft as the other cams referred to. An operating rod 213ª has its upper end pivoted to the operating lever and its lower end pivoted to the right hand end of lever 214ª, keyed or otherwise secured to the shaft 215ª, pivoted to the housing 35ª.

The shaft 215ª also carries a crank, keyed or otherwise secured thereto, so that reciprocation of the rod 213ª effects corresponding oscillation of both the lever and the crank, similar to the arrangement of the preceding embodiment. Pivoted to the other ends of the lever and crank are links, like the links 217 and 218 of the preceding embodiment. The upper ends of said links are connected to the threading head 96ª, in a similar manner, so that turning of the operating cam effects appropriate reciprocation of said head.

Operation of modification

The operation of the modification, just described, is similar to that of the first embodiment, that is, bases 37ª to the interior of which has been applied basing cement are fed down chute 36ª. The lamp, however, before having a base applied to its lower end has its lower leads straightened by the inverted mechanism, otherwise corresponding to that designated 90. It then has a base applied to said lower end by the mechanism of Figure 24, either simultaneously during the application of a base to the upper end thereof, or sequentially with such upper end application. The only difference in said application of the lower bases is that they are moved upward from below in threading the leads 245 through the hollow contact pins 38ª thereof, instead of being moved downward from above in threading the leads 32 through such hollow contact pins 38.

From the foregoing disclosure it will be seen that we have provided mechanism which may do any one of three things:

(1) Apply bases to the tops of fluorescent lamps, turn them end for end, and apply bases to the then top ends of said lamps, (2) Simultaneously apply bases to the tops and bottoms of fluorescent lamps, or:

(3) Apply bases to one end of each of a series of fluorescent lamps and then, without turning end for end apply bases to the other ends of said fluorescent lamps.

Although preferred embodiments have been disclosed, it will be understood that modifications may be made within the spirit and scope of the other.

We claim:

1. A machine for threading bases on the leads of tubular lamps comprising a conveyor for indexing said lamps from one station to another while held in upright positions, means for applying bases over the leads at and cementing them to the tops of said lamps, means for then removing from the line of travel and turning about an axis perpendicular to said line said lamps, one by one, end for end, and means for then applying bases over the leads at and cementing them to the then top ends of said lamps.

2. A machine for threading bases on the leads of tubular lamps, comprising a conveyor for moving and indexing said lamps from one station to another while held in upright positions, a wire straightener for at a certain station drawing the leads of an indexed lamp to approximately vertical positions, means at a subsequent station for centralizing said lamp, and threading means including a funneling device at said subsequent station for, while the lamp is centralized therebeneath, drawing said leads to bring them within the range of said funneling device, means for moving a base with apertured contact pins to the funneling device, so that the leads are pushed through the pin apertures, and means for then releasing the base to leave it on the end of said lamp.

3. A machine for threading bases on the leads of tubular lamps, comprising a conveyor for moving and indexing said lamps from one station to another while held in upright positions, a wire straightener for at a certain station drawing the upper of the leads of an indexed lamp upwardly to approximately vertical positions, means at a subsequent station for centralizing said lamp, and threading means including a funneling device at said subsequent station for, while the lamp is centralized therebeneath, drawing said upper leads upwardly to bring them within the range of said funneling device, means for picking up a base with apertured contact pins and moving it down over the funneling device, so that the leads are pushed through the pin apertures, and means for then releasing the base to leave it on the upper end of said lamp.

4. A machine for processing fluorescent lamps after exhausting and tipping-off comprising a conveyor, means on said conveyor for holding each lamp in upright position, means for causing said conveyor to move step by step so as to index said lamps from one station to another, a preliminary wire straightener for at one station drawing leads of an indexed lamp from a diagonal position toward the lamp to a diagonal position away from the lamp, a final wire straightener for at a subsequent station drawing said diagonal leads to an approximately vertical position, means at a subsequent station for centralizing each lamp, and threading means for applying a base to each lamp, as centralized, said threading means comprising threader jaws including a funneling device for guiding said leads to the hollow contact pins of bases to be applied, a base-holding plunger, means connecting said plunger with a vacuum pump so as to cause bases to adhere thereto for handling, a base release plate engageable by said bases and means synchronized with the operation of the other parts to release a positioned base at the proper time for application to a lamp, a reciprocating threading head in which said base-holding plunger also reciprocates, means for preventing feeding of a base if a lamp is missing at the station preceding that at which bases are applied thereto, and means at a station subsequent to the application of bases for bending over the lead portions that project beyond the ends of the hollow contact pins of such bases.

5. A machine for processing fluorescent lamps after exhausting and tipping-off comprising a conveyor, means on said conveyor for holding each lamp in upright position, means for causing said conveyor to move step by step so as to index said lamps from one station to another, a preliminary wire straightener for at one station drawing the uppermost of the top leads of an indexed lamp upwardly from a diagonally downward position to a diagonally upward position, a final wire straightener for at a subsequent station drawing said diagonally upwardly extending leads to an approximately vertical position, means at a subsequent station for centralizing each lamp and threading means for applying a base to the top of each lamp, as centralized, said threading means comprising threader jaws including a funneling device for guiding said leads to the hollow contact pins of bases to be applied, a base-holding plunger, means connecting said plunger with a vacuum pump so as to cause bases to adhere thereto for handling, a base release plate engageable by said bases and means synchronized with the operation of the other parts to release a positioned base at the proper time for application to a lamp, a reciprocating threading head in which said base-holding plunger also reciprocates, means for preventing feeding of a base if a lamp is missing at the station preceding that at which bases are applied thereto, and means at a station subsequent to the application of bases for bending over the lead portions that project beyond the ends of the hollow contact pins of such bases.

6. A machine for processing fluorescent lamps after exhausting and tipping-off comprising a conveyor, means on said conveyor for holding a series of lamps, means comprising a cam shaft for driving said conveyor to cause each lamp to index from station to station therealong, an operating cam on said shaft, a lever operated thereby, an operating rod having one end pivoted to said lever, an operating shaft, a crank thereon, means pivotally connecting said crank and operating rod, a pair of cranks on said rod, the free ends of which are bifurcated, a bracket in which said operating shaft is mounted, a vertical sleeve reciprocating in said bracket, an arm connected to the lower end of said sleeve, a rod depending from said arm, a head carried at the lower end of said rod, a block pivoted to said head, and arcuate fingers projecting from said block, whereby as the cam rotates, the fingers engage leads, of a fluorescent lamp held on said conveyor, which initially project diagonally toward the lamp, and bend them to a position extending diagonally from said lamp as a preliminary straightening operation.

7. Apparatus for processing fluorescent lamps after exhausting and tipping off comprising a conveyor, means on said conveyor for holding a series of said lamps with their axes vertical, means comprising a cam shaft for driving said conveyor to cause each lamp to index from station to station therealong, an operating cam on said shaft, a lever operated thereby, an operating rod having one end pivoted to said lever, an operating shaft, a crank thereon, means pivotally connecting said crank and operating rod, a pair of cranks on said rod, the free ends of which are bifurcated, a bracket in which said operating shaft is mounted, a vertical sleeve reciprocating in said bracket, a rod reciprocable in said sleeve, the lower end of said rod having teeth cut thereinto forming racks, pinion segments pivoted to said sleeve, final wire-straightening jaws connected to said segments, said bracket having relatively long slots, said sleeve having relatively short slots, a pin extending through said slots and rod, the ends of said pin being received in the bifurcations at the end of said cranks, and friction blocks mounted in said bracket and resiliently urged into engagement with said sleeve, whereby operation of said sleeve and rod by said cam results, first, in an operation of said jaws to grip leads, of a fluorescent lamp held on said conveyor, which project diagonally from said lamp, and then, reciprocation thereof to draw said leads to approximately vertical positions.

8. A machine for processing fluorescent lamps after exhausting and tipping off comprising a conveyor, means on said conveyor for holding a series of said lamps with their axes vertical, means comprising a cam shaft for driving said conveyor to cause each lamp to index from station to station therealong, an operating cam on said shaft, a lever operated thereby, an operating rod having one end pivoted to said lever, an operating shaft, a crank thereon, the free end of said crank being pivotally connected to the other end of said operating rod, said shaft carrying a pair of bevel gears, a pair of vertical shafts, a bevel gear at the top of each vertical shaft meshing with one of said operating shaft bevel gears, and the lower end of each vertical shaft carrying a lamp centralizing jaw so that as the cam rotates the jaws open and close about the top of a fluorescent lamp held on said conveyor as desired for centralizing purposes.

9. A machine for processing fluorescent lamps after exhausting and tipping off, comprising a conveyor, means on said conveyor for holding a series of lamps with their axes vertical, means comprising a cam shaft for driving said conveyor to cause each lamp to index from station to station therealong, a cam on said shaft, a lever operated thereby, an operating rod having one end pivoted to said lever, a threading head at one of said conveyor stations, a base plunger mounted to reciprocate vertically therein along the axis of a fluorescent lamp when at said threading head station, said plunger carrying a hollow extension connected through a flexible tube and valve to a source of vacuum, a solenoid controlling said valve, a cam operated switch controlling the operation of said solenoid, said plunger having a downwardly opening pocket to receive the upstanding hollow contact pins of bases to be applied to said lamps and a pair of ports communicating with the interior of the extension, the lower ends of said ports being lined with resilient rings so that upon engaging a base when the vacuum is applied to said ports, the base will adhere thereto, and means for effecting reciprocation of said plunger comprising a pivot member, a lever mounted to oscillate thereabout, one end of said lever being connected to said operating rod and the other end of said lever being connected to the extension from said plunger.

10. A machine for processing fluorescent lamps after exhausting and tipping off comprising a conveyor, means on said conveyor for holding a series of lamps with their axes vertical, means comprising a cam shaft for driving said conveyor to cause each lamp to index from station to station therealong, means at one station for feeding bases one by one to a position axially alined with one of the lamps of said line of lamps, a base-holding plunger at said station, a plate normally disposed beneath a base at said station, said plate being slidable and carrying a rack, a pinion segment engaging said rack, a shaft on which said segment is mounted, a crank carried by said shaft, an operating rod, one end of which is pivoted to said crank, a cam on said shaft, a lever oscillated by said cam, and means pivoting said lever to the other end of said operating rod, whereby the plate is moved at the proper times between the base supporting and base releasing positions.

11. A machine for processing fluorescent lamps after exhausting and tipping off comprising a conveyor, means on said conveyor for holding a series of lamps with their axes vertical, means comprising a cam shaft for driving said conveyor to cause each lamp to index from station to station therealong, and means at a certain station for detecting the absence of a lamp and thereafter preventing the feeding of a base to said machine comprising a pipe discharging a stream of air toward where a lamp would normally be held at said station, a plate pivoted to the frame of said machine in line with said stream, a switch disposed so as to be closed when the plate is moved by said stream of air to close an electrical circuit, a solenoid in said circuit, a spring-biased armature moved when its solenoid is energized, a base plunger at the station next to that at which said stream of air operates, means mounting said plunger for vertical reciprocation, means for feeding a base to a position beneath said plunger when in raised position, and means for transmitting vertical reciprocating motion to said plunger comprising a cam on said shaft, a cam-lever shaft, a lever mounted on said shaft for oscillation by said cam, an operating rod having one end pivotally connected to said lever, another lever, means pivotally mounting said other lever, the other end of said rod being pivotally connected to said other lever, the other end of said other lever being bifurcated, and links respectively connecting said bifurcations to said base plunger, said operating rod being formed as two portions, the lower portion being spring-biased toward the cam, the upper portion having a reduced extension fitting a pipe at its lower end engaging a spring therein, said pipe being secured to said lower portion, the reduced extension being prevented from separation from said pipe by a key passing through said extension with its ends received in slots in said pipe, said reduced extension carrying a collar, downward movement of which is stopped by said armature when its solenoid is energized, thereby preventing raising of said plunger to accept a base.

12. A machine for threading bases on the leads of tubular lamps, comprising a conveyor for moving and indexing said lamps from one station to another while held in fixed positions, a wire straightener for at a certain station drawing the leads of an indexed lamp to a position approximately parallel to each other and to the longitudinal axis of said lamp, means at a subsequent station for centralizing said lamp, and threading means including a funneling device at said subsequent station for, while the lamp is centralized therebeneath, drawing said leads to bring them within the range of said funneling device, means for moving a base with apertured contact pins to the funneling device, so that the leads are pushed through the pin apertures, and means for then releasing the base to leave it on the end of said lamp.

References Cited in the file of this patent

UNITED STATES PATENTS

| 1,832,677 | Wildeboer | Nov. 17, 1931 |
| 2,069,086 | Donovan et al. | Jan. 26, 1937 |
| 2,069,386 | Palucki | Feb. 2, 1937 |
| 2,120,877 | Uber | June 14, 1938 |
| 2,390,139 | Vasselli | Dec. 4, 1945 |
| 2,419,484 | Danziger | Apr. 22, 1947 |